United States Patent [19]

Wilwerding

[11] 4,085,320
[45] Apr. 18, 1978

[54] AUTOMATIC FOCUS SYSTEM WITH LOSS OF CORRELATION INHIBIT

[75] Inventor: Dennis J. Wilwerding, Littleton, Colo.

[73] Assignee: Honeywell Inc., Minneapolis, Minn.

[21] Appl. No.: 730,483

[22] Filed: Oct. 7, 1976

[51] Int. Cl.² .............................................. G01F 1/20
[52] U.S. Cl. ................... 250/201; 250/204; 354/25
[58] Field of Search ............... 250/201, 204, 209, 234, 250/235; 354/25; 356/1, 4, 5

[56] References Cited

U.S. PATENT DOCUMENTS

| | | | |
|---|---|---|---|
| 3,553,455 | 1/1971 | Sato et al. | 250/201 |
| 4,010,479 | 3/1977 | Nobusawa | 354/25 |
| 4,012,634 | 3/1977 | Bouton et al. | 250/204 |

Primary Examiner—David C. Nelms
Attorney, Agent, or Firm—H. L. Hanson; C. J. Ungemach

[57] ABSTRACT

An automatic continuous focus system of the spatial image correlation type includes means for inhibiting movement of the primary lens if the correlation signal lacks a sufficient amount of variation.

10 Claims, 11 Drawing Figures

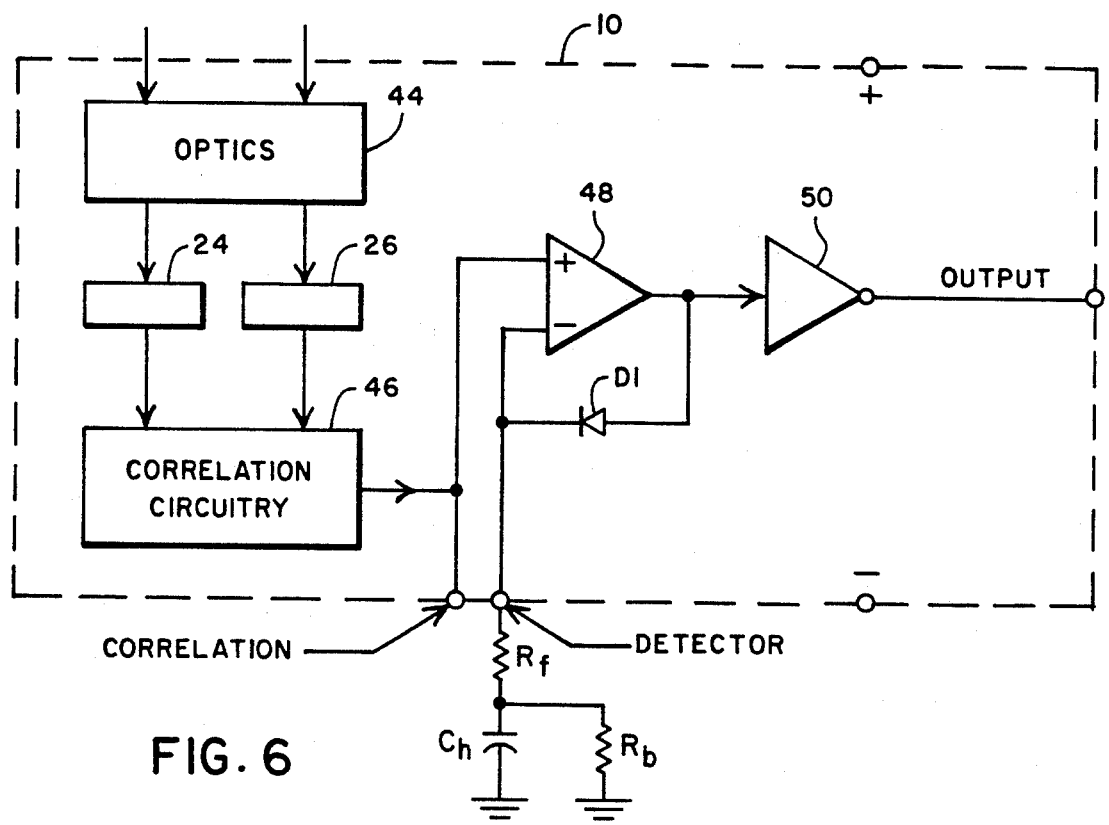
FIG. 6
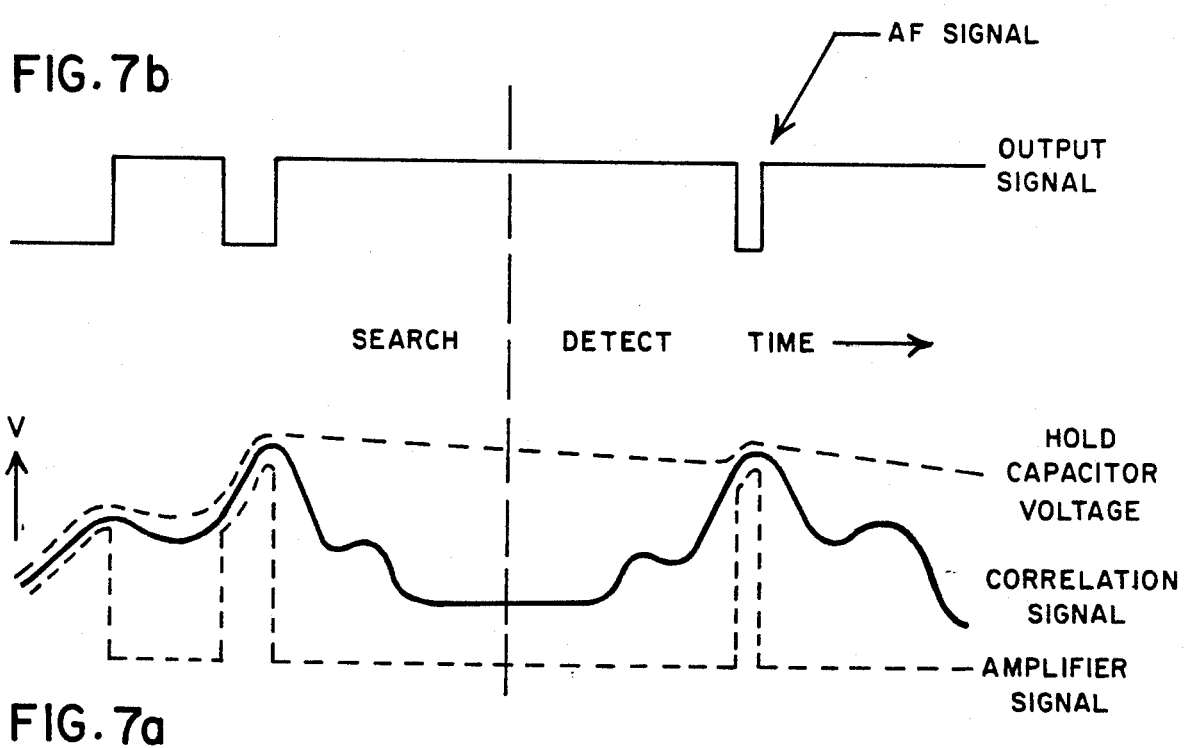
FIG. 7b
FIG. 7a

AUTOMATIC FOCUS SYSTEM WITH LOSS OF CORRELATION INHIBIT

REFERENCE TO COPENDING APPLICATION

Reference is made to copending application by Dennis J. Wilwerding, Ser. No. 728567, entitled "Focus System for Movie Cameras" which was filed Oct. 1, 1976 and is assigned to the same assignee.

BACKGROUND OF THE INVENTION

The present invention relates generally to apparatus for providing a measure of the distance between the apparatus and an object. In particular, the present invention is directed to automatic focusing systems in which a primary optical means, such as the taking lens of a camera, is moved to maintain an image of the object in focus at the plane of a photographic film.

One highly advantageous type of automatic focus apparatus is the spatial image correlation type. Examples of the different forms of arrangements of this type can be found in copending U.S. patent applications Ser. Nos. 627,607, filed Oct. 31, 1975 now U.S. Pat. No. 4,002,899 issued Jan. 11, 1977 and Ser. No. 720,963 filed June 29, 1976 by Norman L. Stauffer, which are assigned to the same assignee as the present application, in U.S. Pat. Nos. 3,836,772, 3,838,275, and 3,958,117 by Norman L. Stauffer, and in U.S. Pat. No. 3,274,914 by Biedermann et al.

The typical spatial image correlation apparatus includes two auxiliary optical elements (for example, lenses or mirrors) and two detector arrays. The object distance is determined by moving one of the auxiliary optical elements relative to one of the radiation responsive detector arrays until they occupy a critical or correlation position. This position is a measure of the existing object to apparatus distance.

The relative movement of the auxiliary optical element and the detector array occurs for each distance measuring or focusing operation. The critical condition occurs when there is best correspondence between the radiation distributions of the two auxiliary or detection images formed on the two detector arrays. This condition of best distribution correspondence results in a unique value or effect in the processed electrical output signals. Typically, the correlation signal will contain a major extremum (either a peak or a valley) and one or more minor extrema. The major extremum is indicative of the distance to the object.

In most systems, the relative movement of the auxiliary optical element with respect to the detector arrays is achieved by moving a lens or mirror relative to one of the detector arrays. The particular position of the element when best distribution correspondence occurs provides a determination of the existing object to apparatus distance. The position of the auxiliary optical element at the time of best correspondence is used to control the position of the primary optical element, such as a camera taking lens.

In the previously mentioned copending application Ser. No. 700,963 by Norman L. Stauffer, the correlation signal includes a major peak which is indicative of the distance to an object. A peak detector is used to determine this major peak. A complete scan of all focus zones is provided to insure that the highest correlation is achieved. The location of the last and, therefore, highest peak detected corresponds to the desired focus position.

SUMMARY OF THE INVENTION

One problem which has been discovered in correlation type automatic focusing systems occurs if the correlation signal lacks sufficient information (i.e., variation) to allow the signal processing circuits to correctly locate the major extremum. This lack of variation can be the result of lack of scene contrast, lack of illumination, or multiple distant targets. In a continuous focus system such as is used with movie cameras, the lack of variation in the correlation signal can result in the lens positioning means randomly driving the prime lens or driving it to either the near or far extreme.

The system of the present invention overcomes this problem. Inhibit means inhibits the lens positioning means if a suitable correlation signal is not received. The prime lens, therefore, remains at the last position at which a suitable focus signal was received.

BRIEF DESCRIPTION OF THE DRAWINGS

FIG. 6 shows the peak detection circuitry associated with the module of FIG. 1.

FIGS. 7a and 7b show an example of the hold capacitor voltage, correlation signal amplifier signal, and output signal produced by the module of FIGS. 1 and 6.

DETAILED DESCRIPTION OF THE PREFERRED EMBODIMENTS

Image Correlation Range Sensing Means

Figure 1:
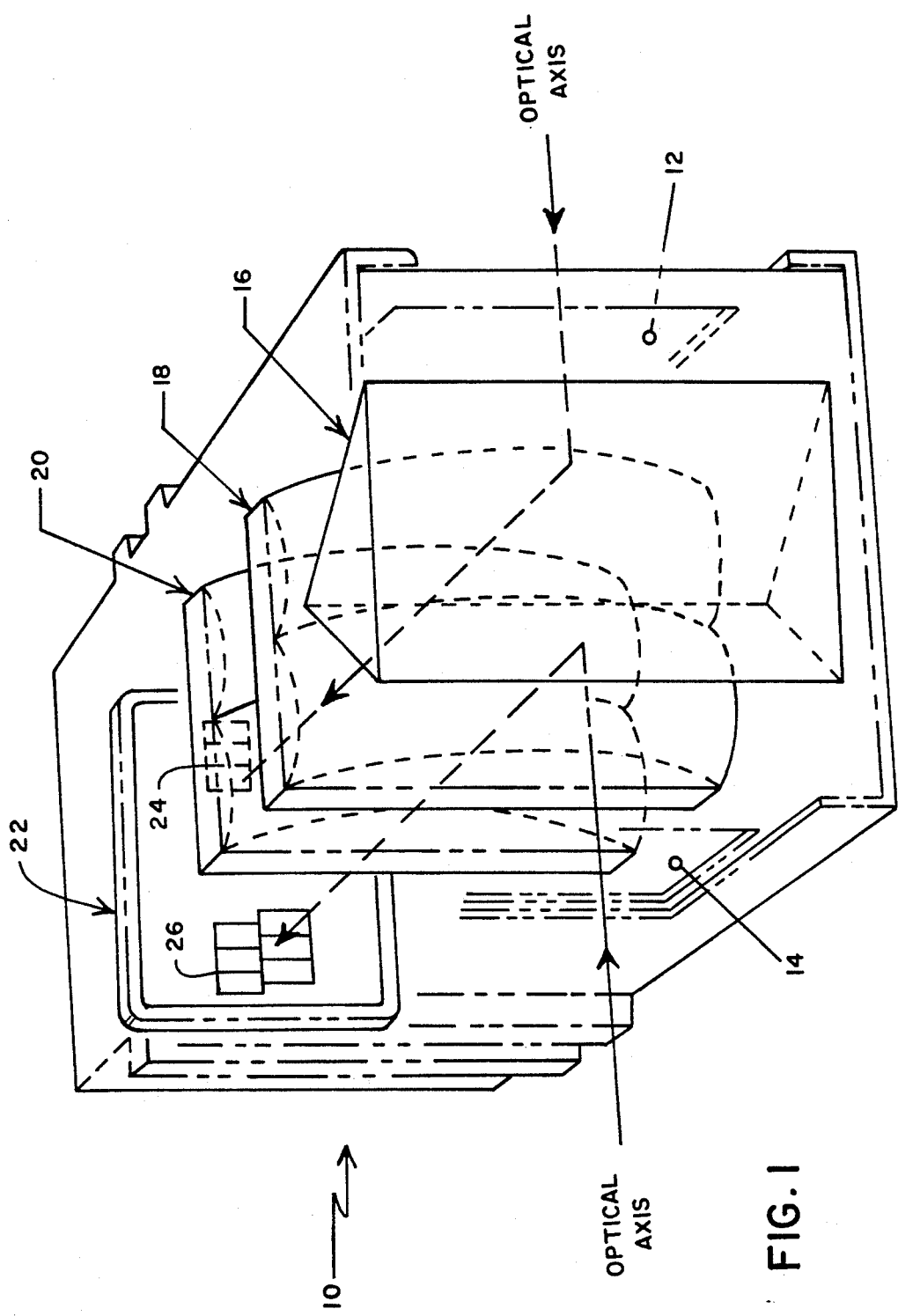
FIG. 1 shows a spatial image correlation range sensing module which may be used in conjunction with the dual scan automatic focus system of the present invention.

FIG. 1 shows one particularly advantageous form of image correlation range sensing means which may be used in the dual scan automatic focus system. A more detailed description of this modular form of range sensing means may be found in the copending application by Norman L. Stauffer, Ser. No. 627,607.

Module 10 of FIG. 1 has two viewing ports, 12 and 14, located on opposite sides. Inside the module is a prism, 16, a twin two-element lens system formed by twin biconvex lens 18 and twin meniscus lens 20, and an integrated circuit 22 including detector arrays 24 and 26 and signal processing circuitry (not shown) connected to the detector arrays. The elements in the module are permanently mounted and require no adjustment or alignment.

Figure 2:
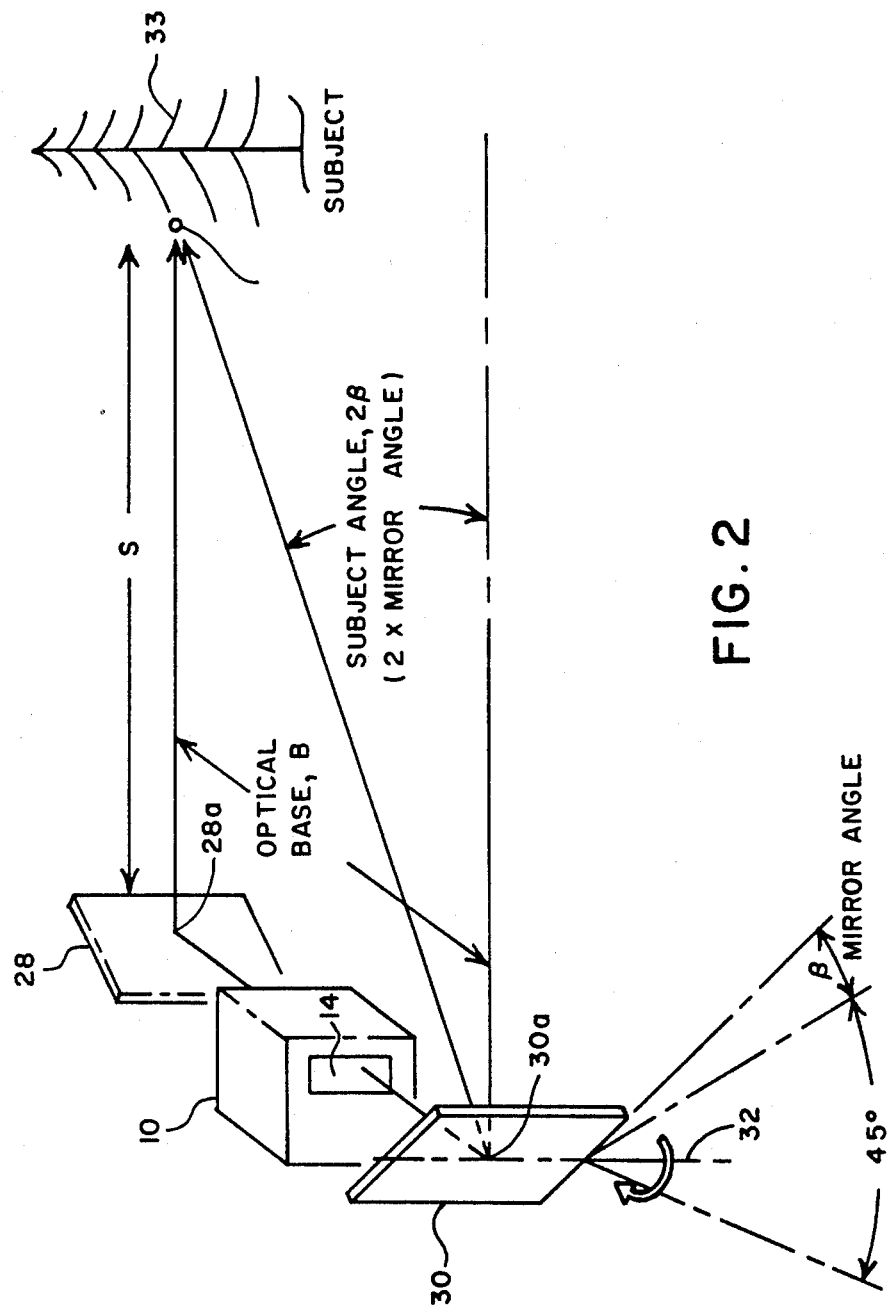
FIG. 2 shows the basic optical configuration of a system using the module of FIG. 1.

To use module 10, two mirrors, 28 and 30, must be positioned so as to direct light from the subject into the two viewing ports. Such a basic system is illustrated in FIG. 2. Mirror 28 provides a fixed view of a portion of the subject field. This portion of the field is imaged within the module 10 onto detector array 24. Mirror 30 is mounted so that it can be rotated about an axis, 32, generally perpendicular to the plane formed by points 28a and 30a on mirrors 28 and 30 and a centralized point 33a on a remote subject 33. Adjustment of mirror 30 allows detector array 26 to view a selected area of the subject field. The light intensity pattern on each array is nearly identical when the subject angle 2β fulfills the conditions $$\tan(2\beta) = B/S,$$

where B is the angle through which mirror 30 is rotated from a 45° position where light from infinity is reflected into viewing port 14. As seen in FIG. 2, angle 2β is also the angle between a line drawn from point 33a on subject 33 and point 30a on mirror 30, and a line drawn from point 33a on subject 33 and point 28a on mirror 28. B is the length of the base from point 28a on mirror 28 to point 30a on mirror 30, and S is the distance between point 33a on subject 33 and point 28a on mirror 28. This identity is recognized by the correlation electronics of integrated circuit 22 as a major extremum (preferably a peak) in the correlation signal.

Figure 3:
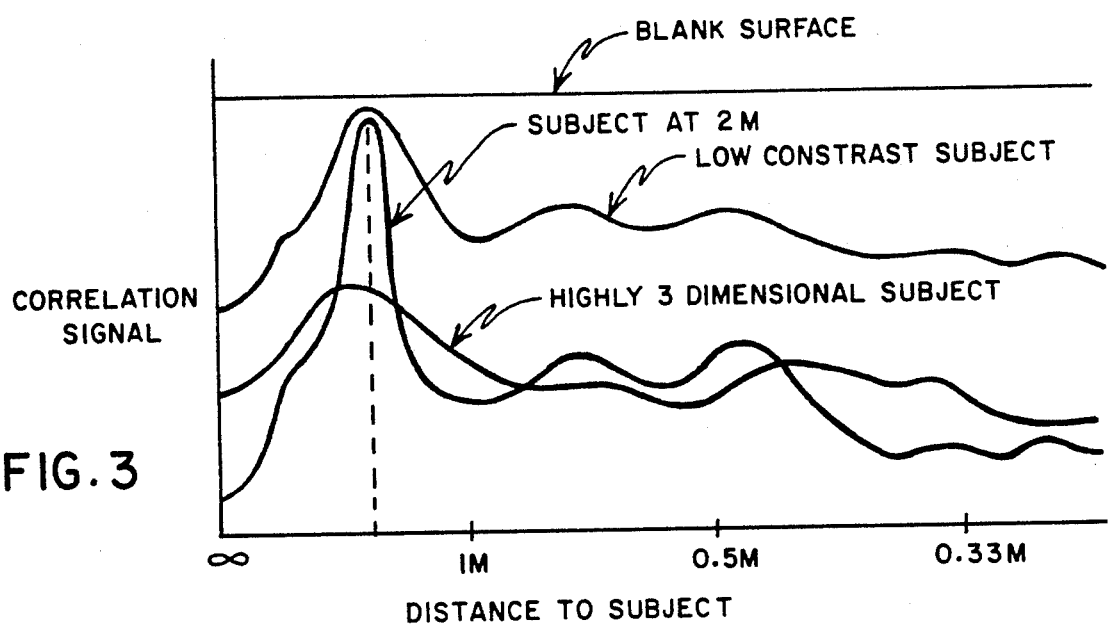
FIG. 3 shows the correlation signal as a function of distance to the subject for several different conditions.

FIG. 3 illustrates the correlation signal as a function of distance to the subject. In FIG. 3, a subject at approximately 2 meters distance from the optical system produces a peak output corresponding to that distance, as shown by the curve labelled "Subject at 2M." At the infinity position mirrors 28 and 30 are each at 45°, thus directing the optical axis from each into two parallel lines. As movable mirror 30 is adjusted from this position, the correlation signal as illustrated in FIG. 3 is produced. Secondary peaks of lesser amplitude may be present as indicated in FIG. 3. If the optical system views a complete blank surface, devoid of any brightness variations, then the correlation signal will be a constant high level. A very low contrast subject will produce, as indicated, a signal which does not drop very much below peak value at out-of-correlation conditions. A highly three-dimensional subject may not produce as high a peak signal as that produced by a strictly two dimensional flat scene.

The present invention overcomes this problem. For ease of description, the "loss-of-correlation inhibit" of the present invention will be described in the context of a "dual scan continuous focus system" of the type described in my previously mentioned copending patent application. It should be understood, however, that the present invention is equally applicable to other systems such as the systems described in the previously mentioned Stauffer application Ser. No. 720,963.

Continuous Focus Systems

Figure 4:
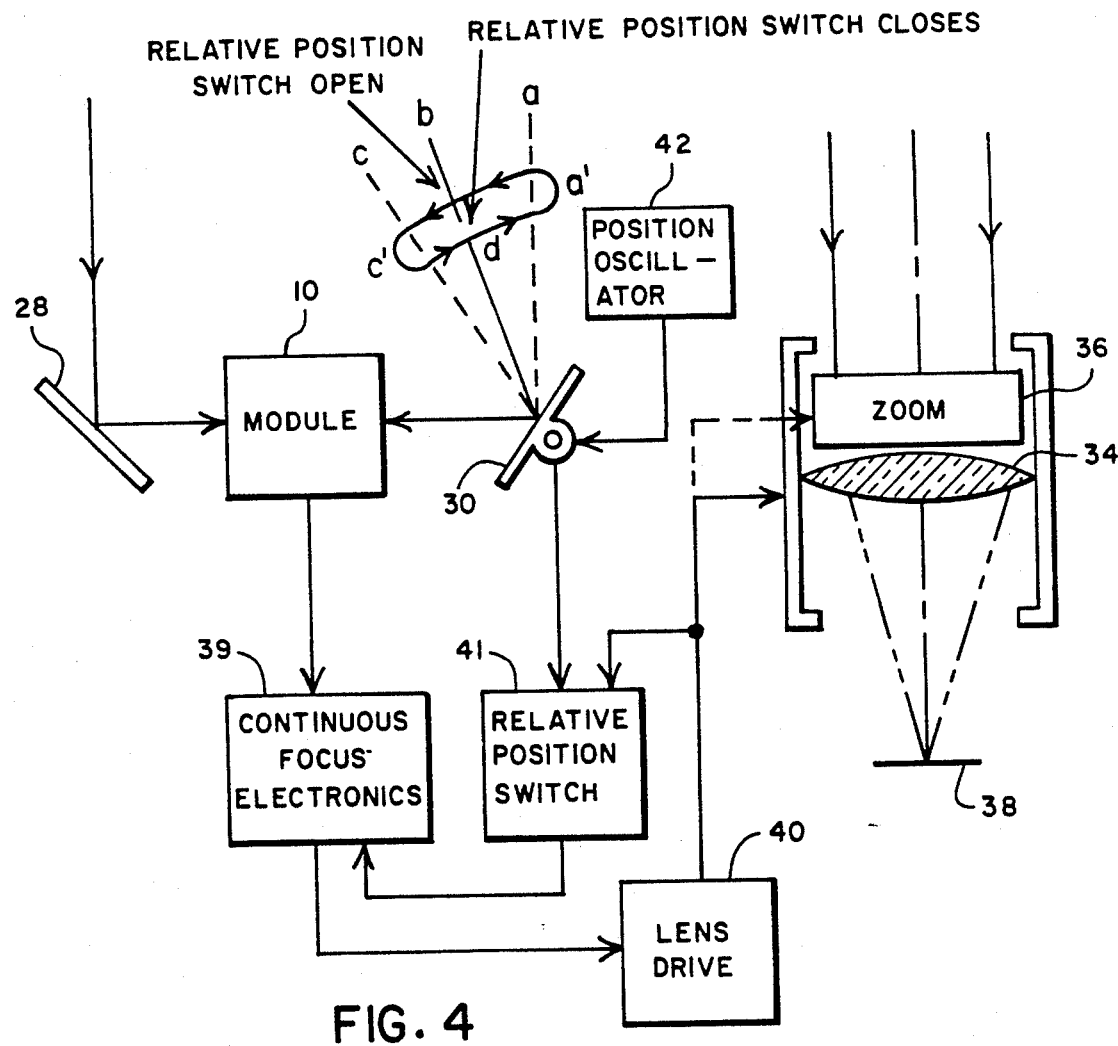
FIG. 4 shows a dual scan continuous focus system.

A dual scan continuous focus system for a movie camera is shown in basic diagram form in FIG. 4. This system is described in further detail in my previously mentioned copending application. The system includes module 10, mirrors 28 and 30, taking lens 34, zoom optics 36, film 38, continuous focus control electronics 39, lens drive 40, relative position switch 41, and position oscillator 42.

Scan mirror 30 is provided with a continuous oscillatory motion by position oscillator 42. This motion extends to a position a' beyond infinity and to a position c' somewhat inside of the desired near focus distance. Each scan cycle of scan mirror 30 includes a "search scan" and a "detection scan."

The opening and closing of relative position switch 41 signals the fact that taking lens 34 and scan mirror 30 are coincidentally looking at, and focused to, the same subject distance. Switch 41 is closed when mirror 30 is in the far field with respect to the position of lens 34 and is open when mirror 30 is in the near field with respect to the position of lens 34. Relative position switch 41 is connected to continuous focus control electronics 39.

Switch 41 may take a variety of different forms, depending on the particular mechanical embodiment of lens drive 40 and position oscillator 42. Examples of relative position switches are shown in the previously mentioned Stauffer application, Ser. No. 720,963. Relative position switch 41 must be able to operate for many cycles and should be capable of factory adjustment to permit system alignment.

Figure 5:
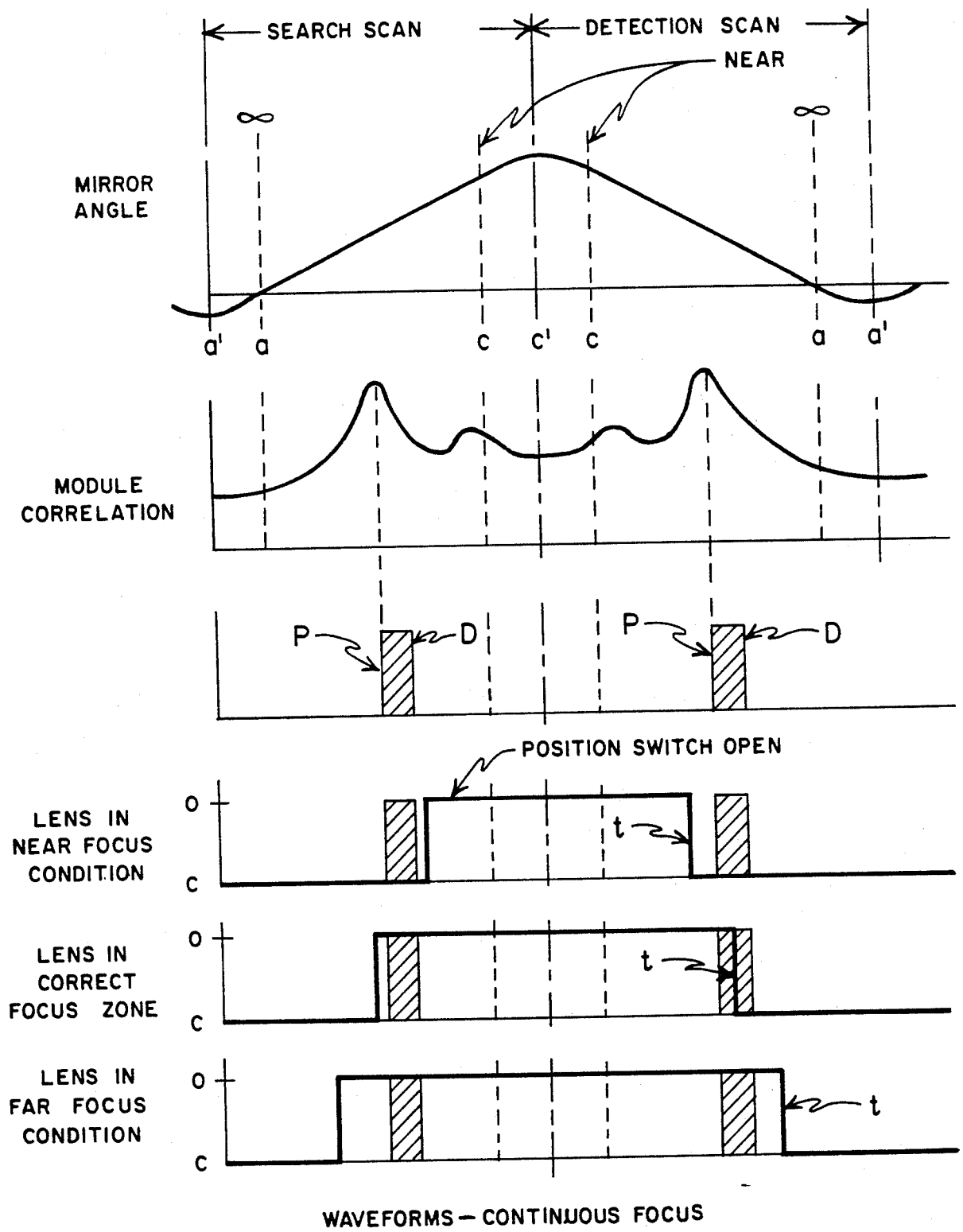
FIG. 5 shows waveforms associated with the operation of the system of FIG. 4.

FIG. 5 illustrates waveforms used in providing continuous focus control. The first waveform shows one cycle of the continuous oscillation of scan mirror 30. The cycle includes a search scan from a' to c' and a detection scan from c' to a'. The second waveform shows the correlation signal resulting from this motion. This waveform is repeated over and over again in a continuous fashion when the same subject is viewed. The third waveform shows the creation of an AF signal, p, near the maximum correlation signal and also following this pulse a short time zone D, which is the focus deadband, is selected to provide an acceptable zone of sharp focus and to provide non-oscillatory motion of the focusing system.

The operation of the system is as follows: The system first interrogates the various signals to determine if the trailing edge, t, of the time interval when the switch is open, occurs during the time interval D of the detection scan. If this is the case, then no focus drive signal would be provided and correct focus position is assumed. If this is not the case, then circuitry determines if the AF signal occurred during the period the switch is open, or during the period that the switch is closed. An AF signal occurring during the switch open portion of the cycle causes the camera lens 34 to be driven toward its near limit position eventually causing it to fall within zone D, terminating focusing action with the subject in focus. Alternatively, if the AF signal occurs during the period when the switch is closed, continuous focus control electronics 39 causes camera lens 34 to be driven toward its infinity position stopping at the position which causes the subject to be in acceptable focus. Examples of these three conditions are illustrated in the fourth, fifth, and sixth waveforms shown in FIG. 5.

The desirability of using a dual scan system is its highly reliable rejection of minor peaks which might activate the peak detection circuitry prematurely. The dual scan system also provides rejection of false correlation peaks which might be introduced by violent camera or subject motion.

Dual Scan Peak Detection and Production of the AF Signal

FIG. 6 shows module 10 as it is used in preferred embodiments of the present invention. Module 10 includes optics (generally designated by numeral 44) for forming two images, two detector arrays, 24 and 26, and correlation circuitry 46 for producing an analog correlation signal proportional to the degree of correlation of the respective optical images. The correlation signal increases positively with increasing correlation.

Extremum sensing circuitry is provided in module 10 to process the correlation signal to determine when the major correlation extremum occurs. In the preferred embodiment shown in FIG. 6, the major extremum is a peak and the extremum sensing circuitry is peak detection circuitry. This circuitry includes differential amplifier 48, diode D1, inverter 50, filter resistor $R_f$, discharge timing resistor $R_b$, and hold capacitor $C_h$. In the embodiment shown in FIG. 6, resistors $R_f$ and $R_b$ and capacitor $C_h$ are external components and are connected to the "Detector" terminal of module 10. Module 10 develops, at the terminal entitled "output" a digital positive going output signal (i.e., the AF signal), at correlation maxima capable of operating external circuitry to stop the camera lens at the proper focus position. It is this change of state of the output signal (i.e., the AF signal), and not the output signal level, which is indicative of the occurrence of a focus peak.

Also shown in FIG. 6 is a terminal entitled "Correlation" from which the correlation signal may be derived. As will be discussed later, the loss-of-correlation inhibit circuitry preferably derives the correlation signal from this terminal.

Hold capacitor $C_h$ connected to the "Detector" terminal provides a hold or comparison signal for the peak detection circuitry and to a large extent controls the sensitivity, noise rejection and overall characteristics of the focus system. Differential amplifier 48 compares the correlation signal with the voltage stored on hold capacitor $C_h$. As the correlation signal rises in voltage, the output of amplifier 48 rises in voltage with it, charging capacitor $C_h$ through feedback diode D1 connected between the output and inverting input. This causes the inverting input to follow the non-inverting input so that the voltage on capacitor $C_h$ is equal to the correlation signal voltage during that portion of time when the correlation signal is rising. Once the correlation signal reaches its peak value and begins to decrease, the voltage on the hold capacitor $C_h$ cannot decrease because of the decoupling of feedback diode D1. Consequently, the output voltage of amplifier 48 falls immediately to negative supply potential. This rapid decrease in the amplifier signal is indicative of a correlation or major peak having occurred. The amplifier signal following a complex correlation waveform is shown in FIG. 7a. FIG. 7b shows the output signal from module 10 produced for the dual scan of FIG. 7a.

During the search scan shown in FIGS. 7a and 7b, the amplifier signal follows the input correlation signal until the first minor peak is reached, at which time the signal drops to negative supply. The amplifier signal begins to rise again when the correlation signal achieves the value equal to the first minor peak and continues to rise until the major peak or correlation peak is found. At this point, the amplifier signal again drops to negative supply. During the detection scan, only the correlation peak is detected. This is because hold capacitor $C_h$ has maintained a voltage proportional to the correlation peak detected during the search scan. This hold capacitor voltage or "comparison signal" exceeds the correlation signal for all portions of the detection scan, except the correlation peak. This is the primary virtue of dual scan operation.

While the peak detection circuitry must be capable of accurately following the correlation signal and determining when a peak occurs, it must at the same time be insensitive to noise on the correlation signal. Noise immunity is achieved by filter resistor $R_f$ in series with the hold capacitor $C_h$. In FIG. 6, resistor $R_f$ is external to module 10 and preferably has a value of about 300 ohms to maintain amplifier stability. Alternatively, filter resistor $R_f$ may be included in module 10. Filter resistor $R_f$ creates a lag in the hold capacitor voltage so that when the correlation signal begins to decrease, it must decrease by some finite value before the amplifier signal from amplifier 48 changes states.

Continuous Focus Control Electronics

The AF signal (i.e., the positive logic "0" to "1" transition in the output signal) indicates that a correlation peak has occurred. The continuous focus control electronics uses the AF signal to develop a control signal capable of moving the camera lens to the proper focus position by operation of lens drive means.

Figure 8:
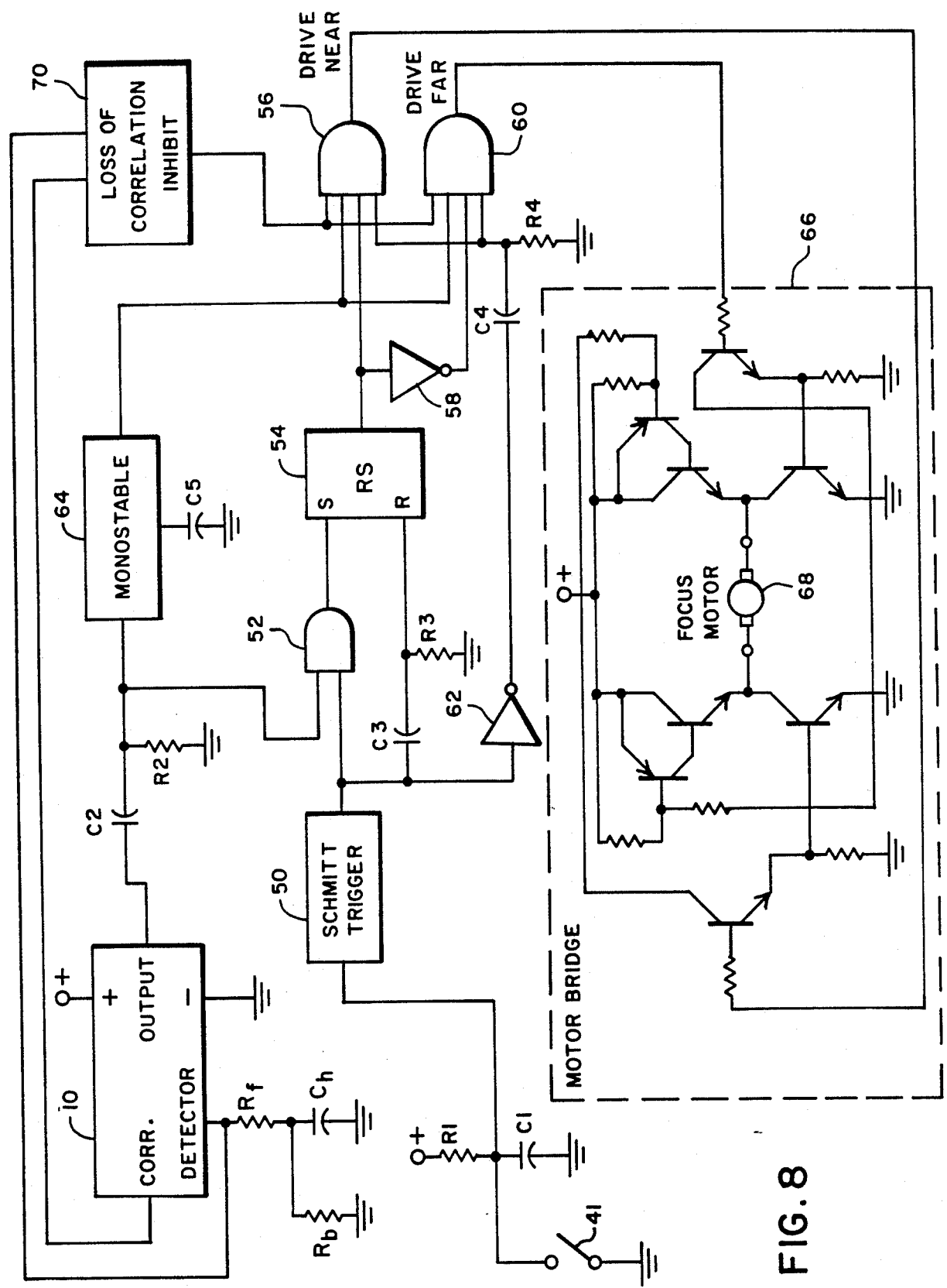
FIG. 8 is a schematic diagram of continuous focus control electronics including a loss-of-correlation inhibit circuit.

FIG. 8 shows a schematic diagram of a preferred embodiment of the continuous focus control electronics for a dual scan continuous focus system. All timing signals for the system of FIG. 8 are derived from relative position switch 41 which indicates the positional relationship of the taking lens of the camera and the scanning mirror. In the embodiment shown in FIG. 8, switch 41 is closed when the scanning mirror is in the far field with respect to the taking lens position and is open when the scanning mirror is in the near field with respect to the lens position.

Resistor R1 and capacitor C1 are connected in series between a positive voltage supply terminal and ground. Switch 41 is connected in parallel with capacitor C1. R1 and C1 form a filter to prevent false signals caused by contact bounce. Schmitt trigger 50 has its input terminal connected to the junction of resistor R1 and capacitor C1. The output of Schmitt trigger 50, therefore, is determined by the state of switch 41.

The output signal from module 10 is differentiated by resistor R2 and capacitor C2. A positive pulse is produced when the AF signal occurs. The differentiated output signal and the output of Schmitt trigger 50 are applied to the input terminals of AND gate 52. The output of AND gate 52 is connected to the set input of RS flip-flop 54. RS flip-flop 54 is set (a logic "1") only when the AF signal occurs while the mirror is in the near field, since output of Schmitt trigger 50 is a "1" when switch 41 is open.

The output of Schmitt trigger 50 is differentiated by capacitor C3 and resistor R3 and applied to the reset input of RS flip-flop 54. A reset pulse is applied to RS flip-flop 54, therefore, when the mirror enters the near field (i.e. Schmitt trigger 50 switches from a "0" to a "1").

The output of RS flip-flop 54 is applied to one input of AND gate 56. The output of RS flip-flop 54 is also inverted by inverter 58 and applied to one input of AND gate 60. The second inputs to AND gates 56 and 60 are produced by inverter 62, capacitor C4, and resistor R4. Inverter 62 inverts the output of Schmitt trigger 50, and capacitor C4 and resistor R4 differentiate the inverted signal. The resulting input to AND gates 56 and 60 is an interrogate pulse which occurs when switch 41 closes, indicating that the mirror is entering the far field.

The third input to AND gates 56 and 60 is derived from monostable 64. This input is a deadband signal which is normally a logic "1" but which may temporarily be a logic "0" for a time period determined by capacitor C5. The input to monostable 64 is connected to the differentiator formed by C2 and R2. Monostable 64, therefore, produces a pulse in response to the AF signal. The outputs of AND gates 56 and 60 are connected to the drive-near and drive-far inputs of motor bridge 66. Motor bridge 66 drives motor 68, which positions the taking lens. A "1" at the output of AND gate 56 causes motor bridge 66 to drive motor 68 and, therefore, the taking lens in the near field direction. Similarly, a "1" at the output of AND gate 60 causes motor bridge 66 to drive motor 68 and the taking lens in the far field direction.

The fourth input to AND gates 56 and 60 is received from loss-of-correlation inhibit circuit 70. The inputs to inhibit circuit 70 are derived from the "Correlation" terminal and, in some cases, also from the "Detector" terminal. As long as the correlation signal contains a predetermined amount of variation, the output of inhibit circuit is a logic "1." If the correlation signal lacks that predetermined amount of variation, however, the output becomes a "0," and operation of motor 68 is inhibited.

The operation system of FIG. 8 is generally as follows: only the highest correlation signal will produce a peak detector output if the peak detector capacitor $C_h$ is not reset after each scan. Resistor $R_b$ provides some drive-down of the capacitor voltage on $C_h$ to ensure detection of the correlation peak. Using this knowledge, it is only necessary to determine if the AF signal occurs in the near or far field with respect to the prime lens focus position. This is accomplished by differentiating the AF signal and ANDing this signal with a signal corresponding to the positional relationship of the taking lens and the scanning mirror. The positional relationship signal is provided by switch 41, resistor R1, capacitor C1, and Schmitt trigger 50.

In the system shown in FIG. 8 the output of AND gate 52 is a "1" only when the AF signal occurs while the scanning mirror is in the near field with respect to the taking lens position. This situation can, of course, be reversed and the signals processed only for an AF signal occurring in the far field.

The output signal of AND gate 52 sets RS flip-flop 54, which was previously reset when the scanning mirror entered the near field. The state of RS flip-flop 54 is interrogated at the instant that the scanning mirror passes from the near to the far field (i.e., that point at which the taking lens focus position and the scanning mirror focus position are coincident). The state of the RS flip-flop 54 is, therefore, indicative of whether the taking lens should be moved toward the near range or the far range. The interrogation is accomplished by differentiating the falling edge of the output of Schmitt trigger 50 with inverter 62, capacitor C4 and resistor R4, and applying this interrogate signal and the RS output to AND gates 56 and 60. The output of AND gate 56 goes to a "1" at interrogation when the AF signal occurs while the scanning mirror is in the near field. Similarly, the output of AND gate 60 goes to a "1" when the AF signal occurs while the scanning mirror is in the far field.

The first exception to this rule is created by the third input to AND gates 56 and 60. Monostable 64 provides the third inputs to AND gates 56 and 60. The output of monostable 64 is normally a "1" but is temporarily a "0" for a period which is started by the differentiated AF signal. The purpose of monostable 64 is to provide a focus deadband in which no motor drive pulse is given. This effectively eliminates continuous hunting for the exact focus point. A "0" output from monostable 64 effectively inhibits the interrogation pulse at AND gates 56 and 60 if the AF signal occurs sufficiently close to the edge of the near range window such that the monostable output pulse overlaps the interrogation pulse in time. In this state, no pulses are transmitted through AND gates 56 and 60 and, consequently, no motor pulses are generated.

The focus motor 68 moves the lens in a direction such that the position of the lens-mirror relation window is coincident with the AF signal. Motor 68 is connected to a bridge 66 such that it may be driven in either direction, the direction corresponding to which AND gate 56 or 60 transmits a pulse. In those systems in which the motor drive time from these pulses is insufficient to adequately move the lens, monostables may be added at the outputs of AND gates 56 and 60 to stretch the motor drive pulses to the desired length.

The second exception to the rule is created by the fourth input to AND gates 56 and 60. Loss-of-correlation inhibit circuit 70 provides the fourth inputs to AND gates 56 and 60. The output of loss-of-correlation inhibit circuit 70 is normally "1" as long as the correlation signal contains a predetermined amount of variation. Whenever the correlation signal lacks this predetermined amount of variation, however, the output of loss-of-correlation inhibit circuit 70 is a "0." This prevents or inhibits any motor drive pulse from being produced during the loss-of-correlation condition. The taking lens, therefore, remains at the position determined by the last suitable correlation signal.

Loss of Correlation Inhibit Circuits

Figure 9:
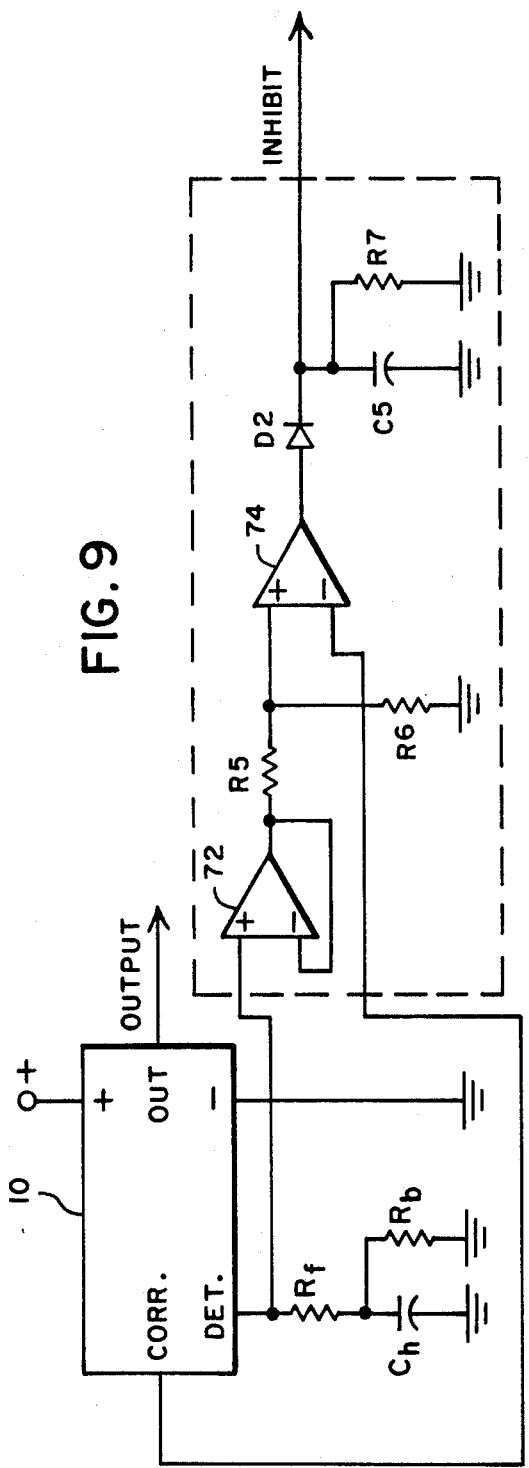
FIG. 9 is a schematic diagram of a "ratioed peak" loss-of-correlation inhibit circuit.
Figure 10:
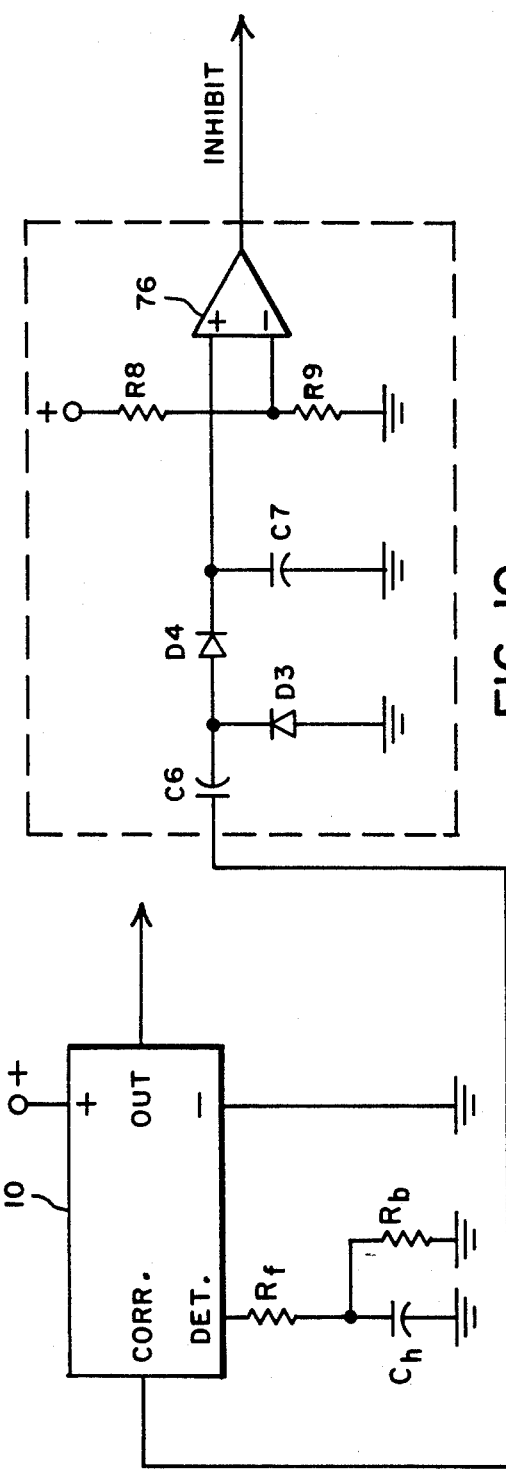
FIG. 10 is a schematic diagram of a loss-of-correlation inhibit circuit using AC detection.

The loss-of-correlation inhibit circuit of the present invention can take a number of different forms. FIGS. 9 and 10 show schematic diagrams of two preferred embodiments of the loss of correlation inhibit circuitry.

FIG. 9 shows a "ratioed peak" loss-of-correlation inhibit circuit. As shown in FIG. 9, the loss-of-correlation inhibit circuit utilizes two inputs. The first input is derived from the "Detector" terminal of module 10, and the second input is derived from the "Correlation" terminal of module 10.

The inhibit circuit of FIG. 9 includes amplifiers 72 and 74, resistors R5, R6, and R7, diode D2, and capacitor C5. The signal from the "Detector" terminal of module 10 represents the stored peak value of the correlation signal. This signal is buffered by amplifier 72, ratioed by resistors R5 and R6, and applied to the non-inverting input of comparator amplifier 74.

The reference voltage in the circuit of FIG. 9 is the voltage applied to the non-inverting input of comparator 74 and compared to the correlation signal. This reference voltage is a fixed percentage of the peak correlation signal. Each time the correlation signal falls below the reference level, capacitor C5 is charged. The inhibit signal is, therefore, in a high state and the operation of the motor drive is enabled. If the correlation signal has insufficient deviation so that the correlation signal never falls below the reference level, the output signal of comparator amplifier 74 remains low, C5 discharges through resistor R7, and motor operation is inhibited because the inhibit signal is low.

FIG. 10 shows another embodiment of the loss of correlation inhibit circuitry of the present invention. The circuit shown in FIG. 10 uses only the correlation signal to generate the inhibit signal. The AC portion of the correlation signal is detected and compared to a reference voltage.

The circuit of FIG. 10 includes capacitors C6 and C7, diodes D3 and D4, resistors R8 and R9, and comparator 76. The correlation signal is received by capacitor C6, diodes D3 and D4, and capacitor C7, which remove the DC component and apply the AC component of the correlation signal to the non-inverting input of comparator 76. This AC component is compared to a DC reference voltage applied to the non-inverting input of comparator amp 76 by the voltage divider formed by resistors R8 and R9. The output of comparator 76 enables the motor drive AND gates when the output is a "1" and inhibits them when the output is a "0." The enable or inhibit of the motor drive, therefore, is based on the magnitude of AC component of the correlation signal.

Conclusion

The loss-of-correlation inhibit of the present invention overcomes the lack of variation in correlation signal problem which can occur in an automatic focus system of the spatial correlation type. This problem can occur due to lack of contrast, lack of illumination, or multiple distant targets. The loss of correlation inhibit circuit can be provided with a relatively small number of components.

While the present invention is disclosed with reference to a series of preferred embodiments, workers skilled in the art will recognize that changes may be made in form and detail without departing from the spirit and scope of the invention. For example, although the present invention has been described with reference to a "dual scan" automatic focus system, it is easily applicable to other automatic focus systems of the spatial correlation type.

The embodiments of the invention in which an exclusive property or right is claimed are defined as follows:

1. An automatic focusing system comprising:
   primary optical means;
   spatial correlation range sensing means for producing a time varying correlation signal, the amount of variation of which changes with different illuminations, different contrasts and different scene compositions;
   positioning means for adjusting the position of the primary optical means in accordance with the time varying correlation signal; and
   inhibit means for inhibiting the positioning means from adjusting the position of the primary optical means when the time varying correlation signal lacks a predetermined amount of variation.

2. The automatic focusing system of claim 1 wherein the spatial correlation range sensing means produces a time varying correlation signal having major extrema indicative of the distance from an object to the range sensing means.

3. The automatic focusing system of claim 2 wherein the positioning means adjusts the position of the primary optical means in accordance with the major extrema.

4. The automatic focusing system of claim 1 wherein the positioning means comprises position control means for receiving the correlation signal and providing a position control signal in accordance therwith; and motive means for adjusting the position of the primary optical means in accordance with the position control signal.

5. The automatic focusing system of claim 4 wherein the inhibit means provides an inhibit signal to the position control means to inhibit the position control means from producing a position control signal.

6. The automatic focusing system of claim 5 wherein the inhibit means comprises:
   reference signal producing means for producing a reference signal; and
   comparing means for comparing the correlation signal with the reference signal and producing an inhibit signal in accordance with the comparison.

7. The automatic focusing system of claim 6 wherein the reference signal producing means receives the correlation signal and provides a reference signal which is a fixed percentage of the value of the extrema of the correlation signal.

8. The automatic focusing system of claim 6 wherein the reference signal positioning means produces a substantially constant reference signal and wherein the comparing means compares the reference signal with an AC component of the correlation signal.

9. In a continuous automatic focusing system of the spatial correlation type, in which the position of primary optical means is controlled in accordance with a time varying correlation signal the magnitude of variation of which changes with different illuminations, different contrasts and different scene compositions, the improvement comprising:
   inhibit means for inhibiting, in the event of loss of a suitable correlation signal, movement of the primary optical means from a position determined by the last suitable correlation signal.

10. Apparatus for use with an auto focus system which has a primary optical member to be positioned at a desired position so as to provide a focused image of an object which is within a field of view, radiation responsive means operable to produce radiation signals which vary with the intensity of radiation received thereby, scanning means operable to transmit radiation from the field of view to the radiation responsive means, signal processing circuitry connected to the radiation responsive means to receive the radiation signals and operable to produce a correlation signal which varies with the operation of the scanning means and normally containing a major extrema indicative of the range to the object, the correlation signal also containing variations the magnitude of which changes the radiation intensity and contrast in the field of view, and positioning means connected to receive the correlation signal and to move the primary optical member toward the desired position, comprising:
   inhibit means connected to receive the correlation signal and to produce an output signal whenever the variations in the correlation signal are below a predetermined level, and
   means connecting said inhibit means to the positioning means to inhibit movement of the primary optical member upon the occurrence of the output signal.

* * * * *